United States Patent [19]
Yu-Shu

[11] Patent Number: 5,627,410
[45] Date of Patent: May 6, 1997

[54] CONTROL CIRCUIT PUSH-CONTROL AND DISPLAY APPARATUS FOR MULTI-PURPOSE POWER LEISURE CAR

[76] Inventor: Lin Yu-Shu, 7F, No. 2-1, Lane 130, Shing-Yi Road, Pei Tou, Taipei, Taiwan

[21] Appl. No.: 523,170

[22] Filed: Aug. 18, 1995

Related U.S. Application Data

[63] Continuation-in-part of Ser. No. 103,929, Aug. 6, 1993, abandoned.

[51] Int. Cl.$^6$ ................................................. A63F 9/14
[52] U.S. Cl. ................................................. 307/10.1
[58] Field of Search ......................... 307/10.1; 273/86 R, 273/85 A; 364/424.05, 426.01, 424.1

[56] References Cited

U.S. PATENT DOCUMENTS

| | | | |
|---|---|---|---|
| 4,029,991 | 6/1977 | Schultz | 315/135 |
| 4,373,722 | 2/1983 | Kite et al. | 273/85 |
| 4,388,558 | 6/1983 | Mizuno et al. | 315/77 |
| 5,267,159 | 11/1993 | O'Neal | 364/424.04 |
| 5,307,050 | 4/1994 | Patton et al. | 340/517 |

*Primary Examiner*—Aditya Krishnan
*Attorney, Agent, or Firm*—W. Wayne Liauh

[57] ABSTRACT

This invention relates to a push-control circuit control and display apparatus for multi-purpose power leisure car, and particularly to a display panel including automatic display control circuit and turning-left, turning-right display and buttons; 6-block shift display and buttons; voltage automatic charge warning and LED warning signal buzzer indication and buttons; headlamp button and LED; solenoid brake release LED display and button; horn button, etc. such multiple functions for leisure power car. It comprises a leisure car main body, an automatic display control circuit display panel mounted in the front part of the main body; the automatic control circuit display panel having turning-left, turning-right signal LED, obstacle LED, shift LED, voltage automatic charge warning LED and release buzzer LED, headlamp LED, solenoid brake release LED; the buttons which are made of light-transmission film, if intended for automatic display of the aforesaid functions during running, the user only needs to press down the markings on the panel as desired and therefore easy operation and leisure function can be achieved hereof.

12 Claims, 7 Drawing Sheets

CONTROL CIRCUIT PUSH-CONTROL AND DISPLAY APPARATUS FOR MULTI-PURPOSE POWER LEISURE CAR

This application is a continuation-in-part of Ser. No. 08/103,929 filing date Aug. 6th, 1993 now abandoned.

FIELD OF THE INVENTION

This invention relates to a push button control circuit and display apparatus for multi-purpose electric car, and particularly to the type of leisure time car having a display panel that incorporates left turn and right turn signal LEDs, obstacle light display, speed shifting, headlamp display, solenoid brake release display, automatic charge and buzzer display functions to enable the users to attain the aim of leisure time sports driving as integrally set up through an automatic control circuit.

BACKGROUND OF THE INVENTION

In recent years sports have become increasingly popular in our society. Bicycles, once a conventional and popular traffic, after persistent evolution and improvement, now are in the mainstream of leisure sports among people. Because of low speed and convenience, conventional leisure bicycles also have become widely popular with modern leisure loving groups. Nevertheless, because ordinary bicycles only have manual mechanical control functions such as moving forward/backward, turning, etc., the conventional bicycles don't completely satisfy the need for novelty in the changing leisure market. In view of this, the inventor has developed a multi-purpose leisure car that is totally safe in operation to replace the conventional type of mechanical power meter indication, rotational speed modulation, push-key type display for headlamp, directional signals, obstacle light, brake lamp and horn, etc. which are poor in terms of function. The invention is a mix of electronic control circuits based on related experience in the manufacture of power leisure cars over the years.

SUMMARY OF THE INVENTION

One object of this invention is to provide a control circuit push button control and display apparatus for power leisure cars to enable indication of multiple functions such as left and right turn signals, headlamp and obstacle warning light.

Another object of this invention is to provide a control circuit push-control and display apparatus for power leisure cars to show the voltage 6-block shifting indication.

Still another object of this invention is to provide a control circuit push-control and display apparatus for power leisure cars to incorporate with functions including automatic charge display, warning buzzer and horn.

Still another object of this invention is to provide a control circuit push-control and display apparatus for a power leisure car to incorporate it with an electronic type brake release system display function.

These and other objects and advantages of the present invention will become apparent to those skilled in the art after considering the following detailed specification together with the accompanying drawings.

DETAILED DESCRIPTION OF THE EMBODIMENTS

Figure 1:
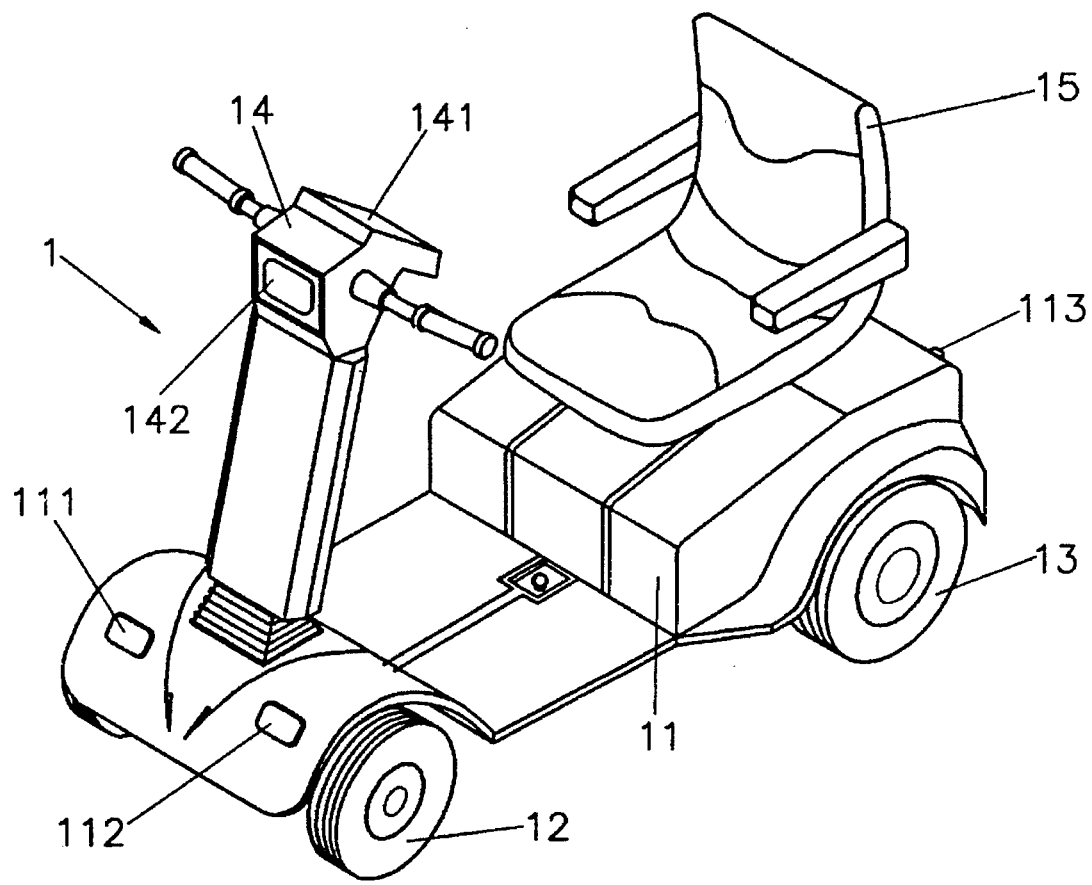
FIG. 1 is a perspective view of multi-purpose power leisure car of the invention.

Referring to the drawings, the present invention comprises a leisure car main body 1 and a display panel mounted in front of a main car body 1. The display panel accommodates an automatic display control circuit 2 for showing various functions on the display panel.

Referring to FIG. 1, the leisure car main body 1 comprises a car body 11, a pair of front wheels 12 and rear wheels 13, a steering rod 14 and a randomly rotable positioning seat 15, wherein the top of the steering rod 14 has a light-transmission film type push button control display panel 141 and on the leading side a headlamp 142. On respective sides of the car body 11 there is a left turn signal lamp 111, a right turn signal lamp 112, and on the rear side an obstacle lamp 113. Automatic function display will be achieved by means of mechanical control made by a user in conjunction with circuit control on the push button control display panel 141.

Figure 2A:
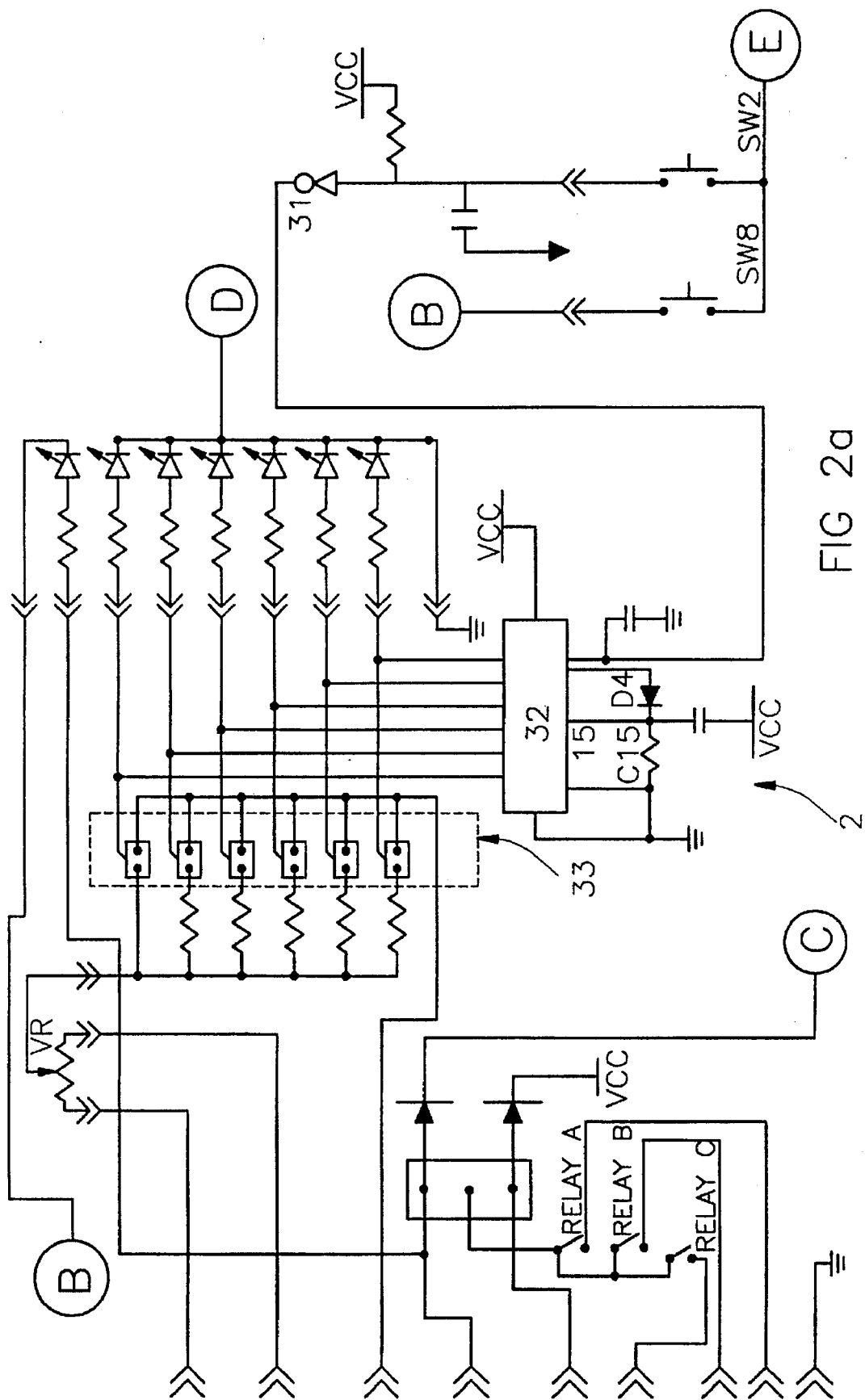
FIG. 2 is automatic display and control circuit diagram for the control circuit push-control and display apparatus for multi-purpose power car of the invention.
Figure 2B:
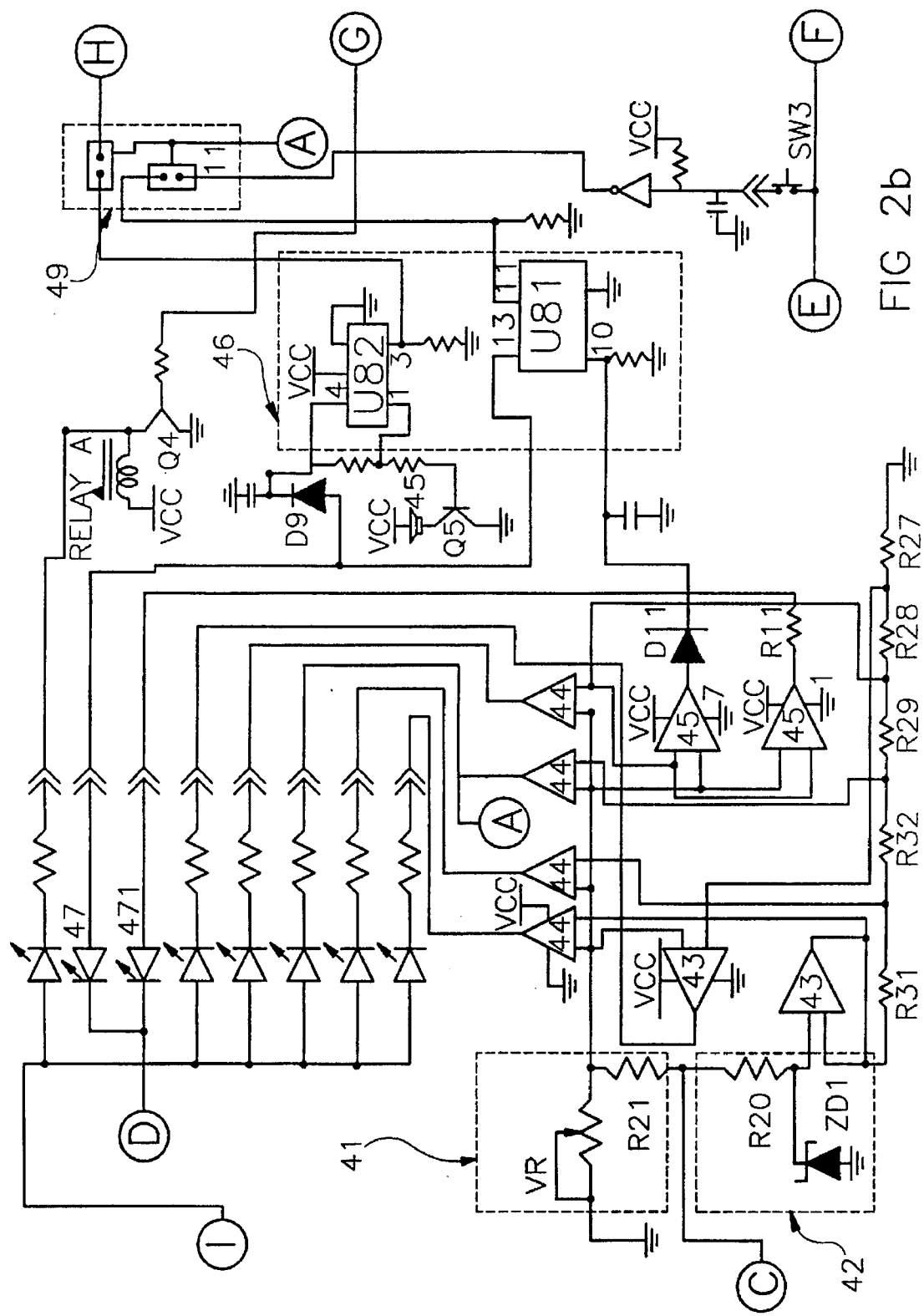
Figure 2C:
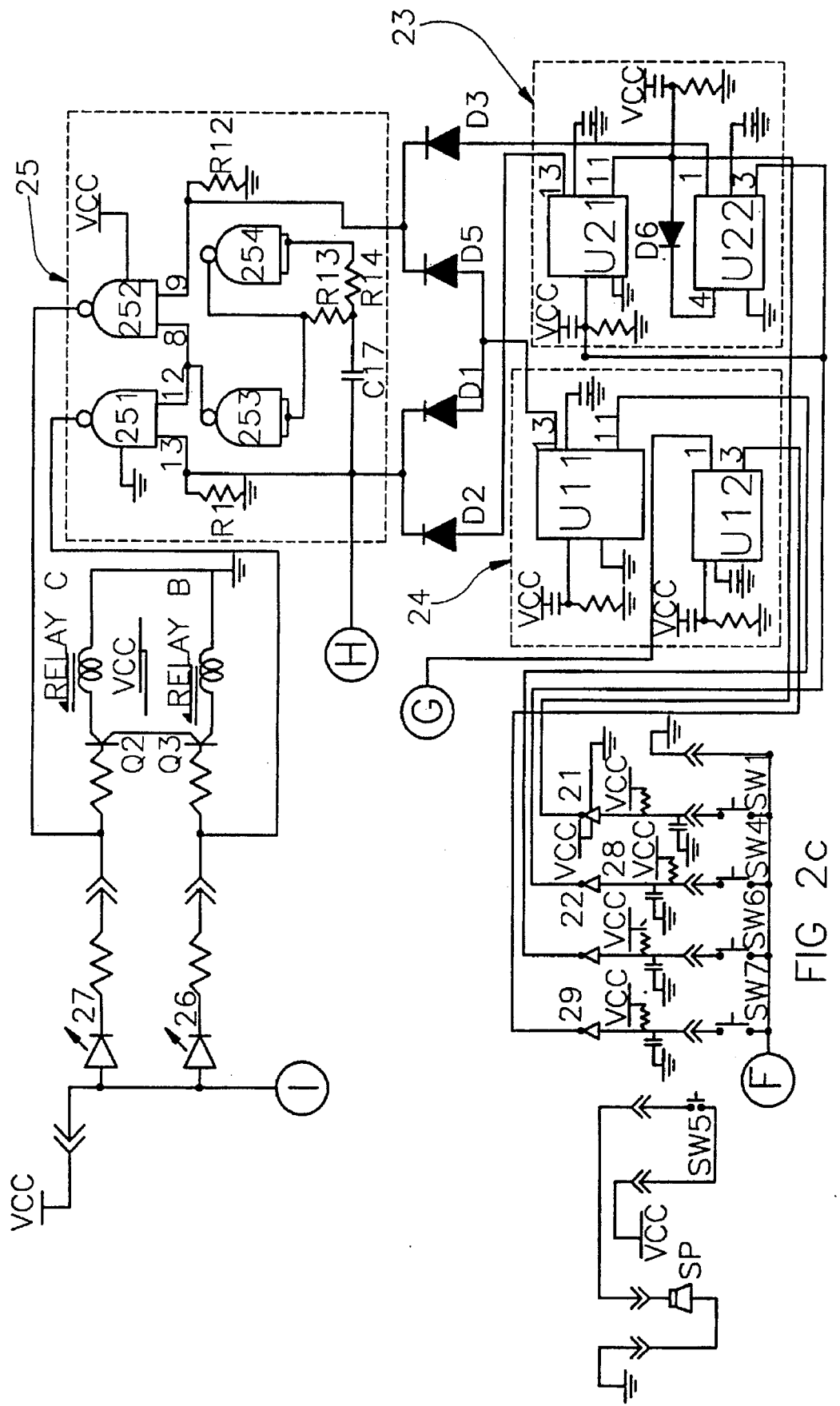
Figure 3:
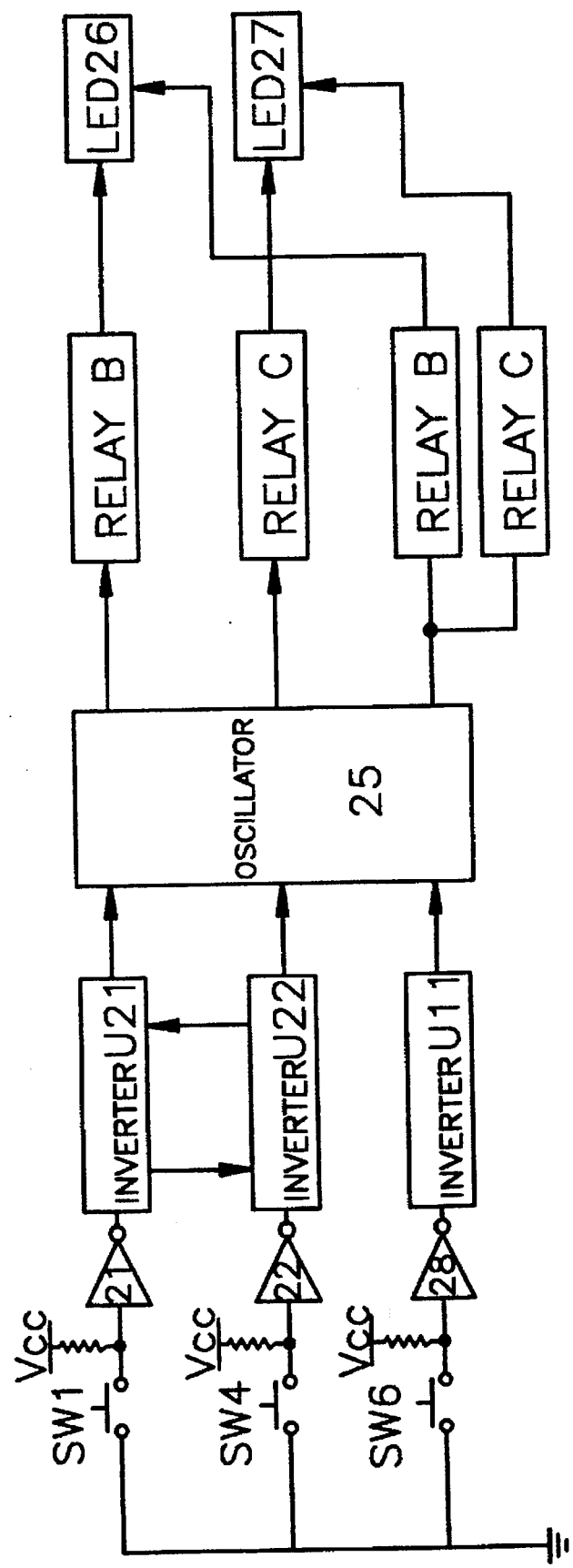
FIG. 3 is a first functional line block diagram for the control circuit push-control and display apparatus for an electric leisure car of the invention.

Referring to FIG. 2, a detailed circuit diagram for the automatic display control circuit of this invention is shown. The operating principle for the left turn lamp, right turn lamp, obstacle lamp and headlamp will be illustrated in conjunction with the block diagram of FIG. 3.

When the leisure car is started none of the push buttons are down, signals will be in "L" level output through the inserters 21, 22 and connected to PIN 4 of the inverter 23 and PIN 11 of the inverter 24, respectively, to enable the output of both inserters 23 and 24 to become "L" and then the two output signals will pass by D2 and D3 respectively. Because negative bias voltage disables the power, the negative end of two diodes will each be in "L" level respectively. Further because the two negative ends are connected to the resistors R1, R12 and two input ends of the oscillator 25 respectively, the output of NAND251, 252 of the oscillator will be in "H" level. Also, the power of the relay B and relay C will be disabled due to D2 and D3 "OFF", whereby the left turn and right turn signal lamps will not light up.

When the left turn lamp button SW1 is pressed down, the output of the inverter 21 will become "H" level and the signal connected to U21 PIN 11 of the inverter 23 will enable PIN 13 output to become "H" level and meanwhile RESET "H" level input through D6 to U22 PIN 4 will cause U22 to be disabled. At the moment D2 "ON" signal will be connected to R1 and PIN 13, C17 of NAND251 of the oscillator 25, and the other end of C17 is connected to R13 and R14 respectively while the other end of the two resistors is connected to the input end of NAND 253 and 254 respectively. The output of NAND254 is connected with R13 to form NAND253 input that is connected to PIN 12 of NAND251, PIN 8 of NAND252 respectively. When D2 "ON", signal will pass by C17, R13, R14, NAND 253, 254, and because of oscillation due to R, C functioning, "H" signal input into U21 PIN 13 will enable NAND251 into action while "ON"/"OFF" as produced by relay B will thus cause the left turn lamp LED26 to flash on and off.

When the left turn lamp button SW1 is being pressed down again, the output of the inverter 21 will become "H"

to cause U21 PIN 13 "L" that will cause IC, transistor and relay to be disabled.

When the right turn lamp button SW4 is being pressed down, the output of the inverter 21 will become "H" and the signal connected to U22 PIN 3 of the inverter 23 will enable PIN 1 output to become "H" and D3 "ON" and because of the oscillation signal produced by the oscillator in conjunction with NAND253, 254, C17, R13, R14, thus, relay C is caused "ON"/"OFF" functioning will then cause the right turn lamp LED27 to flash on and off.

When the right turn lamp button SW4 is being pressed down again, the output of the inverter 22 will become "H" to cause U22 PIN 1 "L" to cause IC, transistor and relay to be disabled.

When the obstacle lamp button SW6 is being pressed down, the output of the inverter 28 will become "H" and the signal connected to U11 PIN 11 of the inverter 24 will enable PIN 13 output to become "H" and signals will be connected to positive end of D1, D5 to cause D1, D5 "ON", and negative end of D1 will be connected to R1, the input end of NAND251, C17 and negative end of D2 while the negative end of D5 will be connected to the negative end of D3, R12 and input end of NAND252; when D1, D5 "ON", because of oscillation signal produced by the oscillator in conjunction with the output of NAND251, 252, thus, relay B, and relay C are thus caused "ON"/"OFF" functioning and then causes the left turn and right turn lamps flashing on and off to give warning function.

When the headlamp button SW7 is being pressed down, the output of the inverter 29 will become "H" to cause U12 PIN 1 "L" that will cause Q4 "OFF", and relay A open.

Figure 4:
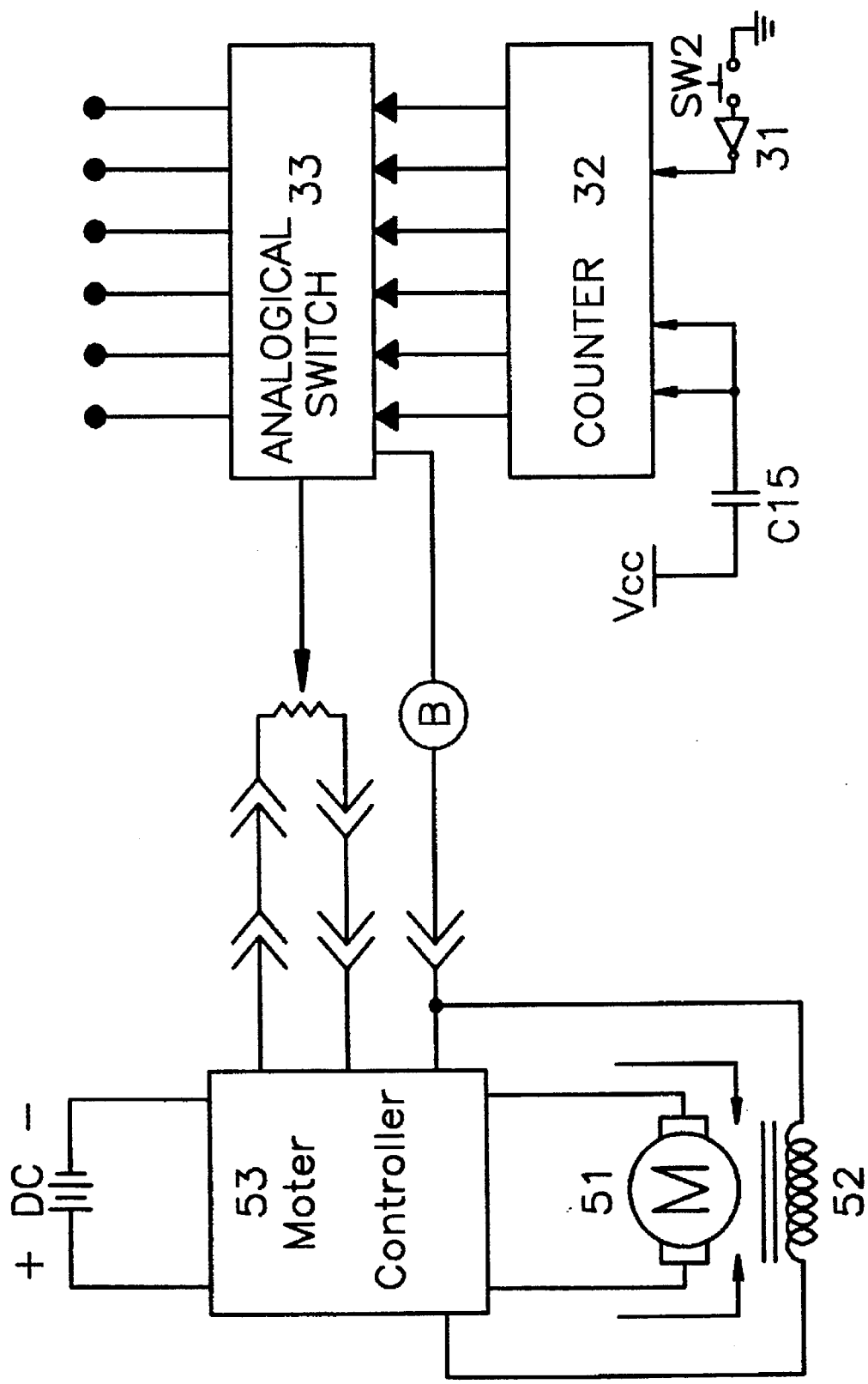
FIG. 4 is a second functional line block diagram for the control circuit push button control and display apparatus for a multi-purpose power leisure car of the invention.

Referring to FIGS. 2 and 4, the present invention includes a drive motor (to be described in a later paragraph). When speed button SW2 is being pressed down, the inverter 31 output will become "H" and the counter 32 will start to count. The counter 32 has a total of 6 sets of outputs respectively connected to the relative outputs on the analogical switch 33. Each of the other ends of the analogical switch 33 is in series with an LED by means of a resistor. Each input end of the analogical switch 33 is in series with a resistor having such OMs as to get decreased following the increase in 5 KVR shunt voltage connected thereto in order to achieve +/−2.5 V varied output. When the power supply is started, the signal will be cleared first by C15 within the counter 32 so as to start counting from Q0, and each press down of the push button will cause the signal to pass by the inverter 31 to clock for counting. Output points from Q0 to Q5 will trigger relative analogical switches to the 6 sets of LED to light up respectively to show the shift number. When Q5 to Q6 "open" to cause the counter to be disabled it provides an idle shift function to keep the main car body in its original state: another press-down—i.e. Q6 to Q7, D4 externally connected to the counter will become "ON" and PIN 15 will give "Clear" signal to cause the main car body to reset counting from Q0. Based on such a cycle modulation, the car may allow the user to select from 6 speeds depending on his or her need.

Figure 5:
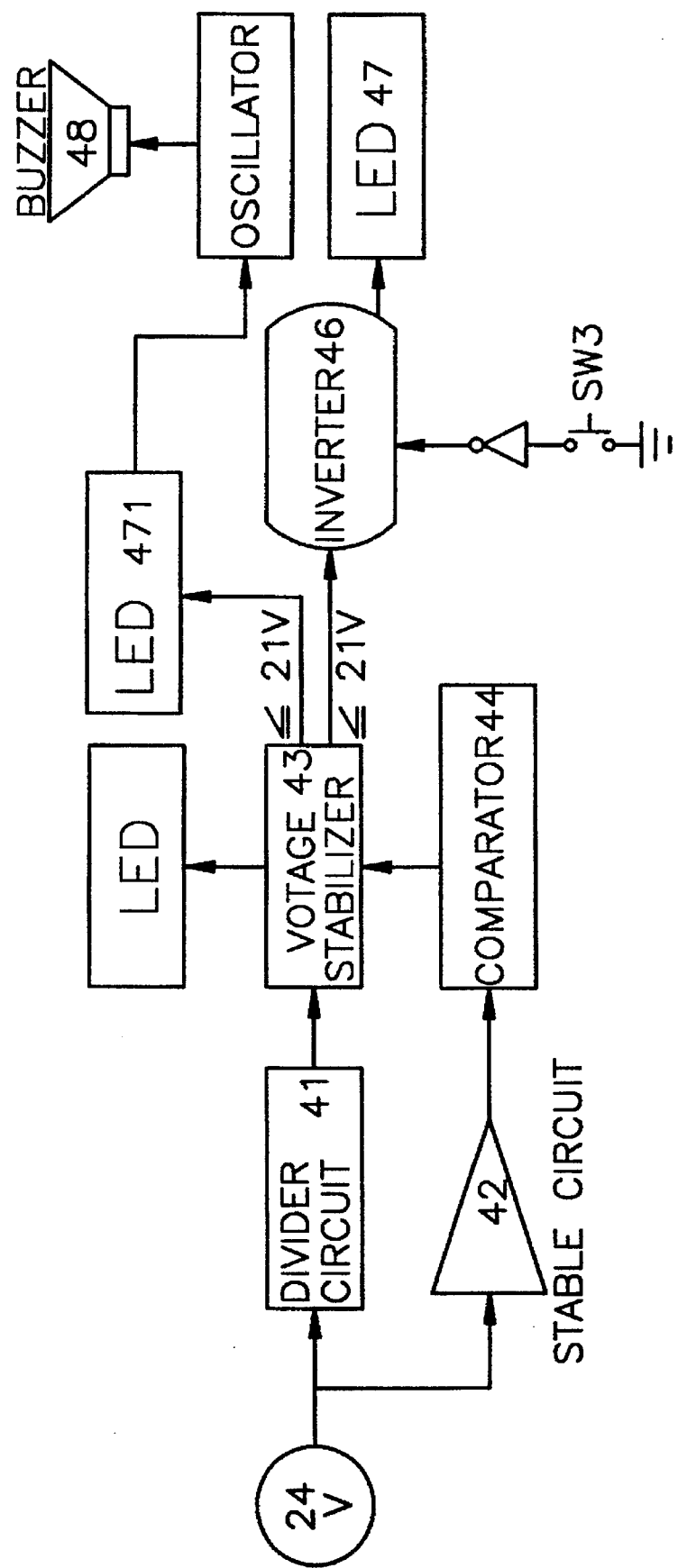
FIG. 5 is a third functional line block diagram for the control circuit push-control and display apparatus for a multi-purpose power leisure car of the invention.

Referring to FIGS. 2 and 5, the automatic charge warning buzzer relates to an automatic warning of big charge LED by the buzzer if a low level appears after a comparison made by the comparator between the reference voltage and operating voltage. If charge clear button SW3 is pressed down, the buzzer will be cut off and the small charge LED will be turn on to retain charge warning function. The function is achieved by a divider circuit 41 consisting of R21 and VR30, and R20 both series with the stable circuit 42 formed by ZD1, through OP voltage stabilizer 43. One end of the stabilizer 43 is in series with each output of R27, R28, R29, R31, R32 to form the comparator 44 and the other input end of the comparator 44 is parallel connected to the divider circuit and the stable circuit, and output end is in series with an LED by virtue of a resistor. The comparator has formed 5 reference levels shown on the display panel by means of the LED, wherein either end of one level is provided for the input of the selector 45, and the other end of the selector 45 is parallel connected to the divider circuit and the stable circuit, and output end is connected to diode D11 and resistor R11; D11 is passing by the inverter 46 that is in series with the small charge LED 47 and buzzer 48, and PIN 11 of the inverter 46 is connected to the oscillator by virtue of analogical switch 49. PIN 3 is connected to the charge button SW3 by virtue of analogical switch 49. R11 is directly in series with the large charge LED 471 and the comparator is designed with 5-block potential (e.g. 15 V, 16 V, 17 V, 18 V, 19 V) while reference potential is pre-defined at 16 V.

When the main body potential is higher than 16 V, PIN 1 on output point of the selector 45 will be "L" and PIN 7 will be "H" while the inverter 46 U81 will gain a clear signal to cause the buzzer "OFF", small/large charge LEDs "OFF" and yet the comparator output end LED will show the potential status in use by the car.

When the main body potential is lower than or equivalent to 16 V, PIN 1 on output end of the selector 45 will be "H" and the large charge LED 471 light up to represent potential shortage, and meanwhile PIN 7 output is "L" so that the inverter is enabled, and Clock signal output from U82 PIN1 through the oscillator and analogical switch 49 will cause Q5 in action while cause the buzzer ON/OFF indicating potential shortage to need charge. When the charge clear button SW3 is pressed down, the signal will be input by analogical switch PIN11 and output from U81 PIN13 to cause the small charge LED "ON" and input PIN4 reset by D9 to cause U82 PIN 1 "L", Q5 "OFF" and buzzer "stop" so as to avoid too much noise, and on the other hand the small charge LED may also serve as a warning function.

Referring to FIGS. 2 and 4, when the leisure car body is kept still, DC motor 51 will be disabled by the brake shoes as the brake coil is not functioning due to both ends of brake coil 52 appearing as a positive DC value and therefore the leisure car assumes a braking state.

When power supply is started, either end of motor controller 53 is grounded to enable the brake coil to be powered on and the brake shoes are pulled by the DC motor so that the car body will be ready to start. During the start of the car if a driver wants to warn other people near by, he or she presses down SW5 to sound the horn to give a warning function and ensure safety. When the leisure car main body in braking state, if the driver wants to release the brake, SW8 has to be pressed down in order to release the brake causing either end of brake coil grounding so that the brake coil will be powered to pull the brake shoes away and allow the car to move and therefore accomplish solenoid braking and release.

When the present invention is being operated, if the user desires to turn left or right, he or she may press down the left turn or right turn signal button on the display panel and directional signal lamp in the front part of the car will light up to warn pedestrians or other vehicles and protect the user. The 6-block shift display will allow the user to know the current gear in use by means of 6-block shift LED on the display panel so as to adjust running speed. The automatic charge warning LED will enable the buzzer to sound and a warning LED on the display panel will light up in case of battery power shortage to advise the user to charge the battery when necessary.

What is claimed is:

1. A control circuit push-control and display apparatus for multi-purpose power leisure car, comprising:

a push-control display panel mounted on said leisure car includes a plurality of push button switches;

control means including a turning left/right display control circuit, a obstacle display control circuit, a headlamp display control circuit, a six-speed shift display control circuit, a warning display circuit and a brake function display circuit coupled to said push-control display panel and to a output means and responsive to a plurality of a user push-control commands for controlling said output means; and said output means coupled to said control means for displaying the driving states of said leisure car and offering a warning while said leisure car has a obstacle condition or a shortage of battery.

2. A control circuit push-control and display apparatus for multi-purpose power leisure car as claimed in claim 1, wherein said push-control display panel is a light-transmission film type push-control display panel.

3. A control circuit push-control and display apparatus for multi-purpose power leisure car as claimed in claim 1, wherein said turning left/right display control circuit having the input end connected to the output end of an inverter, and the other input end connected to a flip-flop of said inverter, the input end of said flip-flop connected to the positive end of the diodes, and the negative end connected to the input end of a oscillator consisted of a resistor, a capacitor and a NAND, an output of said oscillator connected to said output means respectively.

4. A control circuit push-control and display apparatus for multi-purpose power leisure car as claimed in claim 3, wherein said output means includes a turning left/right display having LEDs, a transistor and a relay coupled to said turning left/right display control circuit respectively and generated a turning left/right flashing display function.

5. A control circuit push-control and display apparatus for multi-purpose power leisure car as claimed in claim 1, wherein said obstacle display control circuit having the input end connected to the output end of an inverter, and the other input end connected to a flip-flop of said inverter, the input end of said flip-flop connected to the positive end of diodes, and the negative end connected to the input end of a oscillator consisted of a resitor, a capactior and a NAND, and an output of said oscillator connected to said output means respectively.

6. A control circuit push-control and display apparatus for multi-purpose power leisure car as claimed in claim 5, wherein said output means includes a obstacle display having LEDs, a transistor and a relay coupled to said obstacle display control circuit respectively and generated a obstacle display flashing function.

7. A control circuit push-control and display apparatus for multi-purpose power leisure car as claimed in claim 1, wherein said headlamp display control circuit having the input end connected to the output end of an inverter, and the other input end connected to a flip-flop of said inverter, the input end of said flip-flop connected to the positive end of diodes, and the negative end connected to the input end of a oscillator consisted of a resitor, a capactior and a NAND, and an output of said oscillator connected to said output means respectively.

8. A control circuit push-control and display apparatus for multi-purpose power leisure car as claimed in claim 7, wherein said output means includes a headlamp display having LEDs, a transistor and a relay coupled to said headlamp display control circuit respectively and generated a headlamp display ON/OFF function.

9. A control circuit push-control and display apparatus for multi-purpose power leisure car as claimed in claim 1, wherein said six-speed shift display control circuit having the input end connected to the output end of an inverter, a counter with the input end connected to said inverter, said counter having six outputs connected to six analogical switches respectively, the other end series with a LED by means of a resistor, the input end of said analogical switch series with a resistor, the resistance value of said resistor deceasing responsive to increasing 5 KVR shunt voltage shunt connected thereto, when a power supply being turned on then said counter enabling corresponding said LED display ON subject to the shift number, when the shift number six passed, and two didodes connected to said counter ON generating RESET single so that the shift number restored to original state.

10. A control circuit push-control and display apparatus for multi-purpose power leisure car as claimed in claim 1, wherein said warning display circuits having a shunt circuit consisted of R21 and VR30, a voltage-steady circuit constisted of R20 and ZD1 connected to the input end of OP voltage steadier respectively, the other input end series with a resistor to a comparator input end, and another input end connected said shunt circuit and said voltage-steady circuit respectively, said comparator output end series with said output means by means of a resistor, said comparator, and said OP voltage steadier to form the input end of a selector, and the other input end as level end, the output of said selector connected to the positive end of two didodes and a resistor respectively, the negative end of two didodes connected to the input end of a flip-flop, the output end of said flip-flop connected to output means and two junction of analogical switchs respectively, the other two junction of said analogical switchs connected to said push button switch, a oscillator circuit and said output means, said comparator having a number of sectional potentials, when said potential smaller than the reference potential, said output means ON providing a warring output.

11. A control circuit push-control and display apparatus for multi-purpose power leisure car as claimed in claim 10, wherein said output means having a buzzer and small-charge LED, when said buzzer ON and said push button switch being pushed down and enabled said buzzer OFF and said small-charge LED ON to provide a warning effect continuously.

12. A control circuit push-control and display apparatus for multi-purpose power leisure car as claimed in claim 1, wherein said brake function display circuit having a DC motor, a brake coil, a brake pad, a motor starter, a horn push switch and a brake release push switch, when the power supply being turned on, said brake pad being sucked away from said DC motor, then push said horn push switch enabling to give a warning, when said leisure car in break state, push said break release switch enabling said break pad to be sucked away and said leisure car thus movable so that a brake release function thus accomplished.

* * * * *